3,057,932
PREPARATION OF PARA-(BETA-SUBSTITUTED VINYL)STYRENE AND INTERMEDIATE PRODUCTS
Robert D. Hiser, Charleston, W. Va., assignor to Union Carbide Corporation, a corporation of New York
No Drawing. Filed Dec. 24, 1958, Ser. No. 782,623
10 Claims. (Cl. 260—651)

This invention relates in general to the preparation of substituted styrene compounds and more particularly to the preparation of para-(beta-substituted vinyl)styrene compounds and intermediate products.

The substituted styrene compounds prepared by the process of this invention can be represented by the following general formula:

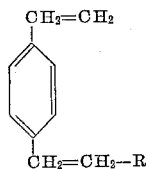
$$\begin{array}{c} CH_2=CH_2 \\ | \\ \\ | \\ CH_2=CH_2-R \end{array}$$

wherein R is a monovalent group and is a member selected from the class consisting of hydrogen and saturated aliphatic hydrocarbon groups. Preferred compounds are those which can be represented by the foregoing formula in which the R is hydrogen or alkyl. Particularly preferred of the alkyl substituted compounds are those in which R represents an alkyl group containing from one to three carbon atoms. Illustrative of the substituted styrene compounds prepared by the process of this invention are the following: para-divinylbenzene, para(1-propenyl)styrene, para(1-butenyl)styrene, para(1-pentenyl)-styrene, para(1-hexenyl)styrene, and the like.

The compounds prepared by the process of this invention are extremely versatile intermediates and have found extensive use in the preparation of various polymers. For example, when small quantities of para-divinylbenzene are copolymerized with styrene monomers, a three dimensional polymer of improved heat distortion and solvent resistant properties is obtained. Likewise, the properties of synthetic rubber of the Buna-S type are improved by the incorporation of small amounts of para-divinylbenzene. One of the more recent and promising uses of this versatile intermediate is in the preparation of diepoxides which have outstanding qualities as condensation resin intermediates.

Heretofore, the preparation of the styrene derivatives, particularly para-divinylbenzene, in commercial quantities, has not been altogether successful. In one method, para-divinylbenzene was prepared from the reaction of terephthalic acid chloride with the sodium salt of malonic ester through a series of steps. These consisted of hydrolysis, decarboxylation to diacetyl benzene, reduction to the dicarbinol, formation of the dibromo derivative, and subsequent dehydrobromination to the divinyl benzene. Following this same general procedure, later workers in the field reported an overall yield of only five percent. While other methods are known for preparing para-divinylbenzene, none provides a satisfactory process for obtaining the pure product in quantities necessary for modern commerce.

It is therefore an object of the present invention to provide a process for the preparation of para-(beta-substituted vinyl)styrene compounds and intermediate products wherein the above disadvantages are eliminated. A further object of the present invention is to provide a process wherein pure para-divinylbenzene is obtained in overall yields which are appreciably higher than in the previous methods. Another object is to provide a method for producing para-(beta-substituted vinyl)styrene compounds from relatively inexpensive raw materials. Other objects of the present invention will be apparent from the following detailed description.

According to the process of the present invention, the para-(beta-substituted vinyl)styrene compounds are obtained in high yields by a three-step reaction from relatively inexpensive starting materials. The process includes the steps of (a) reacting a para-acyl-beta-phenylethyl halide in the presence of a carbonyl-selective reducing agent to produce the corresponding para-(beta-haloethyl)phenylalkyl-carbinol; (b) dehydrating the carbinol to the para-(beta-substituted vinyl)beta-phenylethyl halide; and (c) thereafter subjecting the halide to dehydrohalogenation conditions and recovering the para-(beta-substituted vinyl)styrene. This process can be more clearly illustrated by the following reactions where a para-acyl-beta-phenylethyl-bromide is typical of the halide used, and R is the same as indicated above:

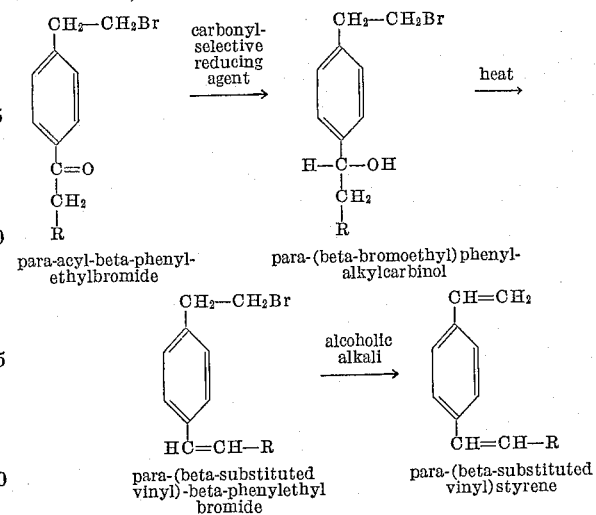

The process of this invention offers several outstanding advantages over those of the earlier methods and other reported syntheses in the literature. One distinct feature is the overall yields obtained by this process which are appreciably higher than those obtained by the previously cited methods. In addition, the raw materials utilized are relatively inexpensive and potentially valuable intermediates can be isolated in relatively high yields.

For the carbonyl-selective reducing agent employed in reducing the para-acyl-beta phenylethyl halide, any metal alkoxide can be used which will effect a selective reduction of the carbonyl group to the hydroxyl group without replacing the active halogen atom. Examples of such compounds are aluminum ethoxide, magnesium ethoxide, sodium ethoxide, aluminum isopropoxide, and the like. A preferred carbonyl-selective reducing agent is aluminum isopropoxide which is more readily available and the most efficient reducing agent for this reaction.

The concentration of metal alkoxide can range from catalytic amounts (ten mol. percent) to an excess of several hundred percent with the rate of reaction increasing with the amount of reducing agent. The preferred range is from one hundred to two hundred percent excess. This affords a reasonable rate of reaction without prohibitive cost.

The temperature employed for the reduction step can vary from about 25° C. to about 110° C. at atmospheric pressure with a preferred range of from about 60° C. to about 100° C. While the reaction rate increases when the higher temperatures are employed, temperatures in excess of 100° C. are conducive to undesirable side reactions.

The preferred temperature and pressure for the dehydration of the carbinol from the reduction step to the para-(beta-substituted vinyl)-beta-phenylethyl halide are from about 150° C. to about 400° C. at 1.0 millimeter of mercury, and particularly from about 150° C. to about 250° C. at the same pressure. At the lower temperatures, dehydration proceeds very slowly while at excessively high temperatures, tar formation is encountered.

In the actual process of the invention, the use of a polymerization inhibitor is preferred to retard the polymerization of the para-(beta-substituted vinyl)-beta-phenylethyl halide as it is formed. Any polymerization inhibitor having a sufficiently high boiling point so that it remains in the reactor and capable of inhibiting polymerization may be used. Generally, the inhibitor is of the antioxidant type, such as the nitrophenols, polyhydric phenols, halogenated nitrophenols, alkyl-substituted catechols, such as t-butylcatechol, and the like. While the concentration of inhibitor can vary from about 0.01 percent by weight to about 2 percent, all that is needed is an inhibiting amount sufficient to inhibit polymerization of the unsaturated para-(beta-substituted vinyl)-beta-phenylethyl halide at the dehydrating temperatures and pressure.

For the dehydrohalogenation of the para-(beta-substituted vinyl)-beta-phenylethyl halide, a metal hydroxide in alcohol is used. Sodium hydroxide in ethanol, potassium hydroxide in methanol, and other alcoholic solutions of metal hydroxides are permissible. The metal hydroxide can be used in alcoholic solutions of concentrations of from about 2 percent by weight of the alcohol to about 20 percent. Dehydrohalogenation is carried out at temperatures of from about 25° C. to about 100° C. at a pressure of one atmosphere with a preferred temperature range of from about 50° C. to 75° C. After extraction with ether and washing with water, the residue is distilled to obtain the para-(beta-substituted vinyl)styrene compound.

Intermediate products formed by the process of this invention can be isolated and identified. For example, when para-acetyl-beta-phenylethyl bromide was reduced with aluminum isopropoxide, the para-(beta-bromoethyl)-phenylmethylcarbinol was shown by infrared analysis to be present in the reaction mixture in approximately 70 percent yield. Upon subsequent dehydration the para-vinyl-beta-phenylethyl bromide was isolated and identified. In a similar manner, the corresponding chloride was reduced to para-(beta-chloroethyl)phenylmethylcarbinol which was isolated and similarly identified by infrared and elemental analysis and thereafter converted to the para-vinyl-beta-phenylethyl chloride. Both the para-vinyl-beta-phenylethyl bromide and the para-vinyl-beta-phenylethyl chloride intermediates are believed to be new compositions of matter.

Comparatively inexpensive compounds can be used as the starting materials for the process of this invention. For example, the beta-phenylethyl bromide can be prepared from styrene and hydrogen bromide in yields of 92 percent [English Patent 438,820 (1935)]. The acetylation of beta-phenylethyl bromide is well known and can be accomplished in good yield [J.A.C.S. 62, 1436 (1940)].

The following examples illustrate the best mode presently contemplated for the preparation of the para-(beta-substituted vinyl)styrene compounds and intermediate products.

*Example I*

A mixture of 35 grams of para-acetyl-beta-phenylethyl bromide in 100 cc. of isopropyl alcohol and crude aluminum isopropoxide made from 5 grams aluminum, 100 cc. isopropyl alcohol and 0.5 gram mercuric chloride was boiled gently on a short glass-packed column. The heat was regulated so that the acetone-isopropyl alcohol mixture distilled at a rate of 10 drops per minute and was continued for 6 hours until no further acetone was formed as indicated by the 2,4-dinitrophenylhydrazine test. Most of the solvent was distilled off at reduced pressure and the cooled residue added slowly with stirring to an excess of cold dilute hydrochloric acid. The resulting oil was separated, and the aqueous portion extracted two times with 75 cc. portions of ethyl ether. The oil and ether extracts were combined and washed successively with water, saturated sodium bicarbonate solution and water, and dried over sodium sulfate. t-Butylcatechol (0.5 gram) was added and the ether distilled off at reduced pressure leaving 34 grams of dark brown residue that on distillation on an oil bath at 170° C. to 200° C. gave 23 grams of distillate boiling between 78° C. to 95° C. at a pressure of 1 millimeter. Redistillation in the presence of t-butylcatechol gave 18 grams (57 percent) of para-vinyl-beta-phenylethyl bromide boiling at 72° C. to 74° C. at a pressure of 0.5 millimeter and having the following analysis: Calculated: C, 57.0; H, 5.2—found: C, 57.8; H, 5.6.

Para-(beta-bromoethyl)styrene dibromide was prepared for identification purposes by adding bromine to a carbon tetrachloride solution of para-vinyl-beta-phenylethyl bromide, and after recrystallization from petroleum ether had a melting point of 60° C. to 61° C. and the following analysis: Calculated for

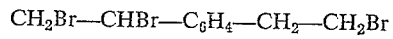

$CH_2Br—CHBr—C_6H_4—CH_2—CH_2Br$

C, 32.4; H, 2.97—found: C, 32.7; H, 2.94.

In a similar manner, other para-(beta-alkylvinyl)-beta-phenylethyl bromides can be prepared from the corresponding para-acyl-beta-phenylethyl bromide.

*Example II*

To 10 grams of the para-vinyl-beta-phenylethyl bromide, dissolved in 20 grams methanol, was added 30 grams of approximately 9 percent methanolic potassium hydroxide. The solution was heated to 50° C. for ten minutes and then allowed to cool slowly to room temperature with some potassium bromide coming out of solution. After cooling to —10° C. and filtering, the methanol was evaporated at reduced pressure and water added to the residue. The oil layer was separated and the aqueous layer extracted two times with ethyl ether. After combining the extracts and oil, washing with water and drying over sodium sulfate, a pinch of t-butylcatechol was added and the ether stripped off. Distillation of the residue gave 3.5 grams pure para-divinylbenzene with the following physical constants: M.P., 29° C. to 31° C. (reported in literature M.P. 31° C.), B.P., 37° C. to 39° C. at a pressure of 0.5 millimeter (reported in literature B.P., 44° C. to 49° C. at a pressure of 1 to 2 millimeters). Three grams of unreacted para-vinyl-beta-phenylethyl bromide were recovered. The yield was 55 percent of the theoretical value. Para-divinylbenzene added bromine easily giving an almost quantitative yield of 1,4-bis-(alpha, beta-dibromoethyl)benzene melting at 156° C. to 157° C.; melting point reported in literature 157° C.

In a similar manner, other para-(beta-alkylvinyl)styrene derivatives can be prepared from the corresponding para-acyl-beta-phenylethyl bromide.

*Example III*

Two mixtures, each consisting of 80 grams of para-acetyl-beta-phenylethyl chloride, 15 grams commercial aluminum isopropoxide and 300 cc. anhydrous isopropyl alcohol were heated on short glass-packed columns. The heat was regulated so that approximately ten drops per minute of acetone-isopropyl alcohol mixture was distilled and was continued for sixteen hours until no further acetone was formed. The two runs were combined and most of the solvent was distilled at reduced pressure. The cooled residue was added slowly with stirring to 1300 cc. of approximately 10 percent aqueous hydrochloric acid. The oil was separated, and the aqueous portion extracted two times with 300 cc. portions of ethyl ether. The oil and ether extracts were combined and washed successively with 200 cc. water, 200 cc. saturated sodium bicarbonate solution, and 200 cc. water, and dried at room temperature over 20 grams of anhydrous sodium sulfate. t-Butylcatechol (0.5 gram) was added, and the ether stripped off at reduced pressure leaving a residue of 153 grams that on distillation gave 93 grams distillate boiling at 152° C. to 164° C. at a pressure of 15 millimeters. Redistillation gave pure para-(beta-chloroethyl)-phenylmethylcarbinol in approximately 57 percent yield boiling at 161° C. to 161.5° C. at a pressure of 15 millimeters and having the following analysis: Calculated: C, 65.08%; H, 7.04%; Cl, 19.2%—found: C, 65.07%; H, 6.67%; Cl, 19.55%.

Other para-(beta-chloroethyl)phenylalkylcarbinols can be prepared in a similar manner from the corresponding para-acyl-beta-phenylethyl chlorides.

*Example IV*

Twenty-one grams of para-(beta-chloroethyl)phenylmethylcarbinol, containing 0.2 gram t-butylcatechol, in a small flask evacuated to 200 mm., was immersed in a preheated Woods metal bath at 330° C. A mixture of water and oil (15 grams) distilled. After separation of the water and addtion of 0.2 gram t-butylcatechol, the oil was redistilled, giving 11 grams para-vinyl-beta-phenylethyl chloride boiling at 110° C. to 112° C. at a pressure of 15 millimeters. It was identified by infrared analyses and by conversion to para-(beta-chloroethyl)styrene dibromide which had the following analysis: Calculated C, 36.75%; H, 3.3%; Cl, 10.9%—found: C, 36.69%; H, 3.54%; Cl, 11.6%.

Ten grams of the para-vinyl-beta-phenylethyl chloride were heated at 65° C. for thirty minutes with 70 cc. of 5 percent ethanolic sodium hydroxide. On cooling, some sodium chloride came out of the solution. After cooling to −10° C. and filtering, the ethanol was evaporated at reduced pressure and 100 cc. of water added to the residue. The oil layer was separated and the aqueous layer was extracted two times with a total of 100 cc. ethyl ether. After combining the oil and ethyl ether extracts, washing with $H_2O$ and drying over sodium sulfate, 0.1 gram t-butylcatechol was added and the ether stripped off. Distillation of the residue gave 4.5 grams para-divinylbenzene: (M.P. 30° C.; B.P. 40° C. to 42° C. at a pressure of 1 millimeter), and 3.0 grams of unreacted para-vinyl-beta-phenylethyl chloride. The yield was 57.5 percent of the theoretical value.

In a similar manner, other para(beta-alkylvinyl)styrene derivatives can be prepared from the corresponding para-(beta-chloroethyl)phenylalkylcarbinols.

It is to be understood that the foregoing detailed description has been given for clearness of understanding of the present invention and no unnecessary limitations are to be understood therefrom except as such limitations appear in the claims.

What is claimed is:
1. A para-vinyl-beta-phenylethyl halide.
2. Para-vinyl-beta-phenylethyl bromide.
3. Para-vinyl-beta-phenylethyl chloride.
4. A process for the production of a para-(beta-substituted vinyl)styrene which includes the steps of reacting a para-acyl-beta-phenylethyl halide in the presence of a carbonyl-selective reducing agent to produce the corresponding para-(beta-haloethyl)phenylalkylcarbinol; dehydrating said carbinol to produce the para-(beta-substituted vinyl)-beta-phenylethyl halide; and thereafter subjecting said halide to dehydrohalogenation conditions and recovering the para-(beta-substituted vinyl)styrene.
5. A process for the production of a para-(beta-substituted vinyl)styrene of the following general formula:

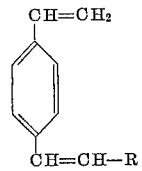

wherein R is a monovalent group and is a member selected from the class consisting of hydrogen and saturated aliphatic hydrocarbon groups, which includes the steps of reacting a para-acyl-beta-phenylethyl halide in the presence of a carbonyl-selective reducing agent to produce the corresponding para-(beta-haloethyl)phenylalkylcarbinol; dehydrating said carbinol to produce the para-(beta-substituted vinyl)beta-phenylethyl halide; and thereafter subjecting said halide to dehydrohalogenation conditions and recovering the para-(beta-substituted vinyl)styrene.
6. A process as claimed in claim 4 wherein the carbonyl-selective reducing agent is a metal alkoxide.
7. A process as claimed in claim 6 wherein the metal alkoxide is aluminum isopropoxide.
8. A process for the production of para-divinylbenzene which includes the steps of reacting a para-acetyl-beta-phenylethyl halide in the presence of a carbonyl-selective reducing agent to produce the corresponding para-(beta-haloethyl)phenylmethylcarbinol; dehydrating said carbinol to produce para-vinyl-beta-phenylethyl halide; and thereafter subjecting said halide to dehydrohalogenation conditions and recovering para-divinylbenzene.
9. A process as claimed in claim 8 wherein tthe carbinol-dehydration step is effected in the presence of an inhibitor sufficient to inhibit polymerization of the para-vinyl-beta-phenylethyl halide.
10. A process as claimed in claim 9 wherein the inhibitor is t-butylcatechol.

References Cited in the file of this patent

UNITED STATES PATENTS

| | | |
|---|---|---|
| 2,507,506 | Dreisbach et al. | May 16, 1950 |
| 2,780,604 | Clarke et al. | Feb. 5, 1957 |
| 2,802,812 | Overberger | Aug. 13, 1957 |

OTHER REFERENCES

Ingle: Ber. Deut. Chem., vol 27, pp. 2526–29 (1894) 4 pages.

Deluchat: Chem. Abstracts, vol. 28 (1934), col. 3062, 1 page.

Foreman et al.; Jour. Amer. Chem. Soc., vol. 62 (1940), page 1436.